United States Patent [19]

Moll

[11] 4,169,579
[45] Oct. 2, 1979

[54] TRUCK TRAILER TONGUE STAND

[75] Inventor: Jack E. Moll, New Berlin, Wis.

[73] Assignee: Miller Tilt-Top Trailer, Inc., Milwaukee, Wis.

[21] Appl. No.: 887,477

[22] Filed: Mar. 17, 1978

[51] Int. Cl.² .............................................. B66F 7/26
[52] U.S. Cl. .................................... 254/45; 254/86 R
[58] Field of Search ........................ 254/45, 86 R, 98; 280/763, 764

[56] References Cited

U.S. PATENT DOCUMENTS 3,425,714  2/1969  Morris ................................. 254/86 R

*Primary Examiner*—Robert C. Watson

[57] ABSTRACT

A detachable trailer for transporting heavy equipment and the like includes a forward tongue adapted for hitching to a towing vehicle and a support assembly for supporting the tongue on the ground at an elevation desired for hitching. The support assembly includes a screw type stand which is supported from a tongue-mounted bracket for pivotal movement between a lowered or support position wherein the stand base can be lowered into engagement with the ground and a raised or stowed position for over-the-road travel. A locking pin carried by the stand is releasably biased into engagement with angularly space apertures in the bracket to releasably retain the stand in the support and stowed positions.

6 Claims, 6 Drawing Figures

TRUCK TRAILER TONGUE STAND

BACKGROUND OF THE INVENTION

This invention relates to trailers and, more particularly, to detachable trailers including a forward tongue for hitching to a towing vehicle and means for supporting the tongue on the ground at an elevation desired for hitching.

One type of detachable trailers, such as trailers used for transporting heavy machinery and equipment, includes a load platform carried by a frame supported on rear wheels and a forwardly extending tongue adapted for connection to the towing vehicle. A vertically adjustable support means usually is provided on the frame or the tongue for supporting the tongue from the ground at an elevation desired for hitching when the trailer is detached from the towing vehicle. A screw type stand or wheel assembly mounted on the tongue is commonly used for this purpose.

After the trailer has been hitched to the towing vehicle, the ground-engaging foot or base of the jack or the wheel(s) of the wheel assembly is elevated to provide sufficient clearance for over-the-road travel, e.g., elevated about 8-10 inches. When a manual crank is used for this operation, raising and lowering the tongue support can be quite laborious and time consuming and there always is the possibility that a careless operator will not elevate the support sufficiently to prevent damage during travel.

SUMMARY OF THE INVENTION

A principal object of the invention is to provide a detachable trailer including a tongue support assembly which can be conveniently moved between a support position for supporting the trailer tongue at an elevation desired for hitching and a stowed position for travel.

Another principal object of the invention is to provide such a trailer including a locking mechanism for releasably locking the support assembly in the support and stowed positions and means for preventing damage to the locking mechanism in the event the towing vehicle is slammed rearwardly into the tongue during hitching.

A further principal object of the invention is to provide a tongue support assembly for detachable trailers which support includes a screw type stand and is arranged to minimize the amount of cranking required to place the support assembly in a stowed position for over-the-road travel.

Other objects, advantages and aspects of the invention will become apparent to those skilled in the art upon reviewing the following detailed description, the drawing and the appended claims.

The invention provides a detachable trailer including a mobile load-carrying frame, a forward tongue on the frame adapted to be hitched to a towing vehicle, and a support assembly for supporting the tongue at an elevation desired for hitching. The support assembly includes an elongated main support and a base member mounted on the main support for relative axial movement. The main support is mounted on the tongue for pivotal movement between a lowered or support position wherein the main support is generally vertical and the lower end of the base portion can be moved into engagement with the ground and a raised or stowed position wherein clearance between the ground and the main support and the base portion is sufficient for over-the-road travel. A locking mechanism is provided on the tongue and on the main support for selectively and releasably retaining the support assembly in the support and stowed positions.

In a preferred embodiment, the support assembly includes a conventional screw-type trailer stand and a shaft mounted on the stand body for pivotally supporting the stand on the trailer tongue.

In one embodiment, the locking mechanism includes a bracket mounted on the tongue and having a pair of apertures situated at locations corresponding to the support and stowed positions of the stand and further includes a locking pin mounted on the stand body for reciprocative movement relative to the bracket. The inner end of the locking pin is biased into releasable engagement with the bracket apertures to releasably retain the stand in the support and stowed positions. The locking pin is retracted from the apertures by a lever pivotally connected to the outer end thereof and preferably is arranged to also serve as a handle for pivoting the stand from one position to another after the locking pin has been retracted from an aperture.

DESCRIPTION OF THE PREFERRED EMBODIMENTS

Figure 2:
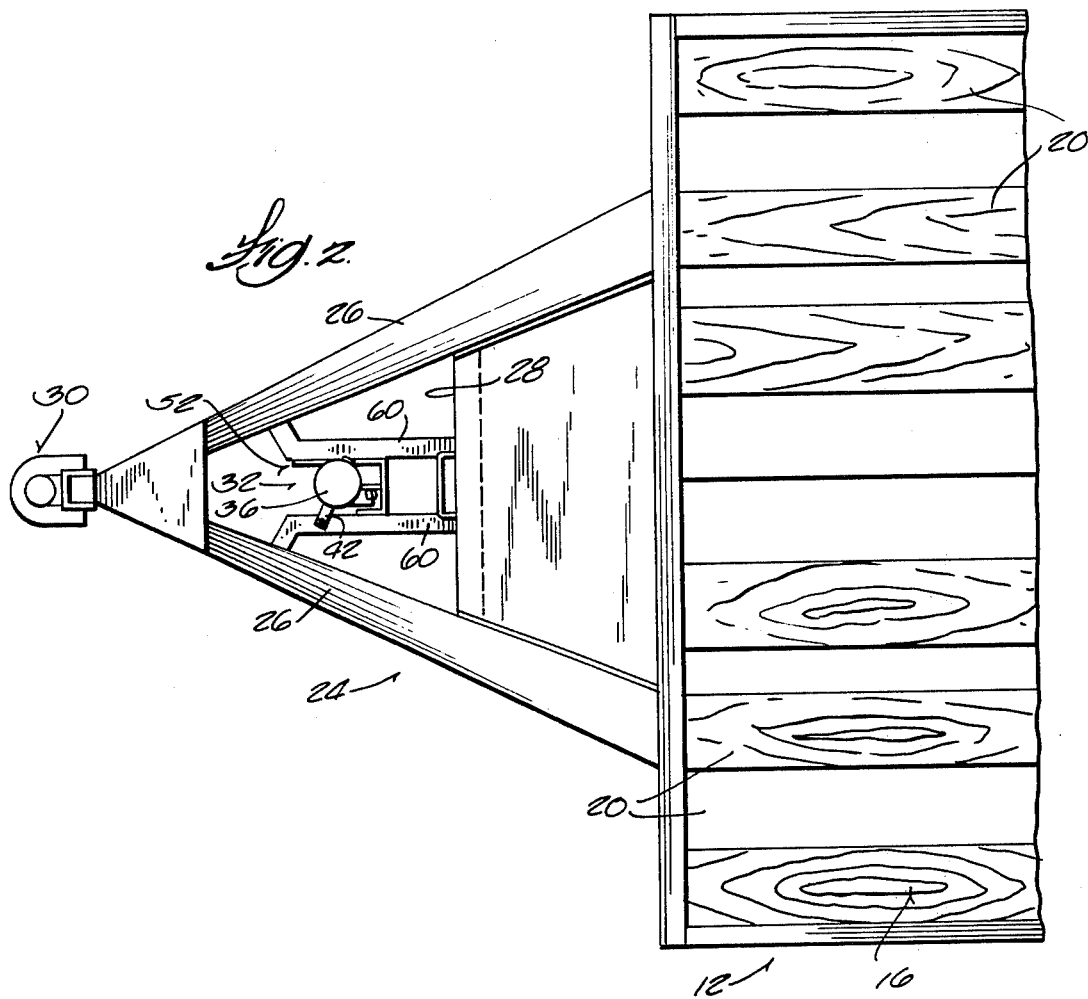
FIG. 2 is a fragmentary top view of the front end portion of the trailer.

Illustrated in the drawing is a detachable trailer 10 for transporting heavy equipment, such as a bulldozer, tractor or similar heavy equipment. The trailer 10 generally is constructed in the manner illustrated in U.S. Pat. No. 3,795,333 and includes an elongated load-carrying frame 12 suitably supported by a pair of laterally spaced rear wheel assemblies (not shown) for over-the-road travel. The frame 12 includes a downwardly inclined or sloping rear end portion 14 disposed behind and in overhanging relation to the wheel assemblies. Supported on the frame 12 is a main platform or deck 16 and a rear platform or deck 18, both of which, to a large extent, are composed of a plurality of longitudinally extending hardwood planks 20 (see FIG. 2).

Figure 1:
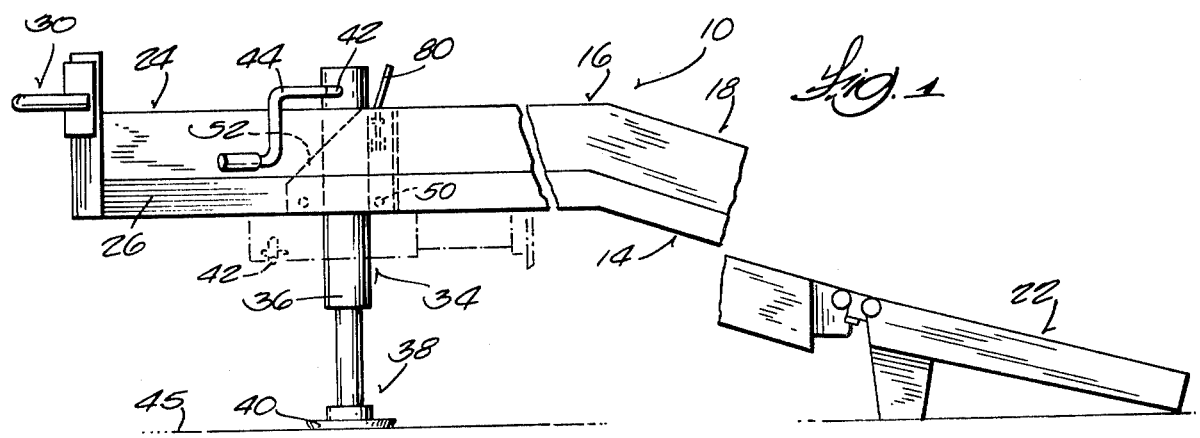
FIG. 1 is a fragmentary side elevational view of a detachable trailer incorporating a support assembly of the invention with the support assembly shown in the support position.

Pivotally mounted on the rear end of the frame 12 is a pair of ramp units 22 (one shown) which are arranged to facilitate driving a bulldozer (not shown) or similar mobile equipment onto and off the decks 16 and 18 for loading and unloading. Each of the ramp units 22 can be swung between a loading position resting on the ground, shown in FIG. 1 and a folded or hauling position resting on the rear deck 18.

Fixedly mounted on and extending forwardly from the front end of the frame 12 is a tongue 24 arranged for hitching to the draw bar of a towing vehicle (not shown). The tongue 24 (FIG. 2) includes a pair of generally horizontal side frame members 26 which converge towards each other in a forward direction. The forward ends of the side frame members 26 are suitably fastened together and an intermediate cross member 28 extends between the side frame members 26 to form an A-frame structure. Supported from the apex of the A-frame structure is a clevis assembly 30 forming a hitch for the trailer 10.

When the trailer is detached or unhitched from the towing vehicle as shown, the tongue 24 is supported on the ground by a support assembly including vertical movement adjustment means whereby the elevation of a clevis assembly 30 can be adjusted as required for convenient connection to the hitching mechanism on the towing vehicle. More specifically, the support assembly includes a conventional screw type trailer tongue stand 34 having an elongated, cylindrical main support or body 36 and a movable base member 38 mounted for reciprocative vertical or axial movement relative to the body 36 and carrying a lower ground-engaging foot 40. The tongue stand 34 also includes a rotatable crank pin 42 carrying an inner bevel gear (not shown) which is located inside the body 36 and meshes with another bevel gear (not shown) carried on a threaded member (not shown) which is located inside the body 36 and effects axial movement of the base member 38 relative to the body 36 in response to rotation of the crank pin 42 with a removable hand crank 44.

The tongue stand 34 is mounted on the tongue 26 for relative pivotal movement about a generally horizontal axis between a lowered or support position (shown by solid lines in FIG. 1) wherein the body 36 is generally vertical and the foot 40 is engageable with the ground 45 and a raised or stowed position (shown by the dashed lines in FIG. 1) wherein the clearance between the ground surface and the body 36 and foot 40 is sufficient for over-the-road travel. More specifically, affixed on the stand body 36, about midway between the opposite ends thereof, is a first member or pivot block 46 having an arcuate inner surface conforming with the exterior of the stand body 36. The pivot block 46 carries a horizontally extending pin or shaft 50 which serves as a pivot for the stand 34.

Figure 3:
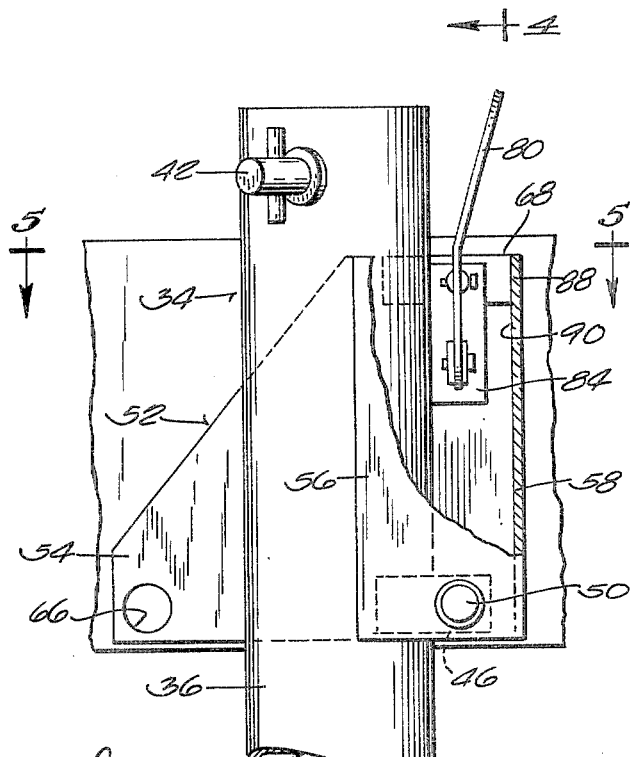
FIG. 3 is an enlarged fragmentary view of the support assembly.
Figure 4:
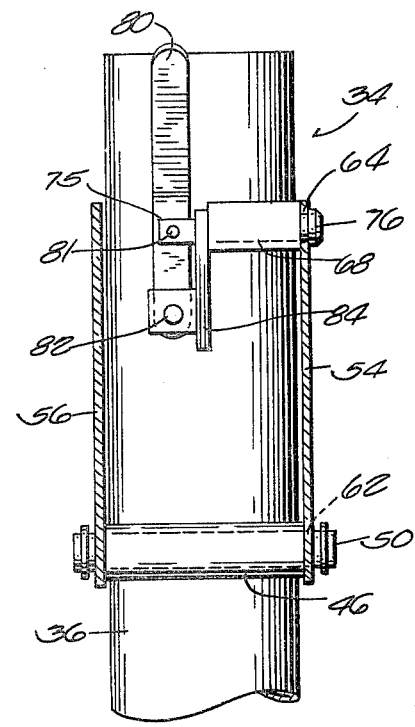
FIG. 4 is a view taken generally along line 4—4 in FIG. 3.
Figure 5:
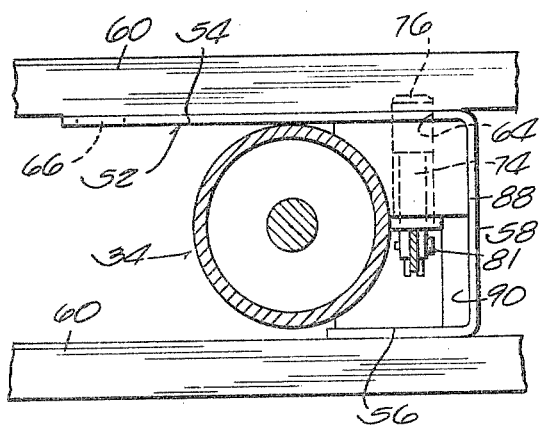
FIG. 5 is a view taken generally along line 5—5 in FIG. 3.

The shaft 50 is pivotally supported by a bracket 52 which, as best shown in FIGS. 3 and 5, has a generally J-shaped cross section and includes a first leg 54, a second leg 56 laterally spaced from and shorter than the first leg 54, and a cross leg 58 connecting the first and second legs 54 and 56. The bracket 52 (FIG. 2) is disposed between and mounted on a pair of laterally spaced sub-frame members 60 which are located between the side frame members 26 with the opposite ends of each connected to the cross member 28 and a respective side frame member 26. The opposite ends of the pivot shaft 50 are rotatably received (FIG. 4) in opposed apertures 62 provided in the bracket legs 54 and 56 and the bracket cross leg 58 extends generally parallel to the stand pivot axis defined by the shaft 50.

Locking means are provided on the stand 34 and on the tongue 24 for selectively and releasably locking the stand 34 in the support and stowed positions. More specifically, such locking means includes a pair of apertures 64 and 66 in the bracket leg 54 which are situated relative to the stand pivot axis at locations respectively corresponding to the support and stowed positions of the stand 34. For instance, the center of the aperture 64 can be located on a vertical plane intersecting the pivot axis defined by the shaft 50 and the center of the aperture 66 can be located approximately 85°–90° from the aperture 64 with respect to that plane.

Figure 6:
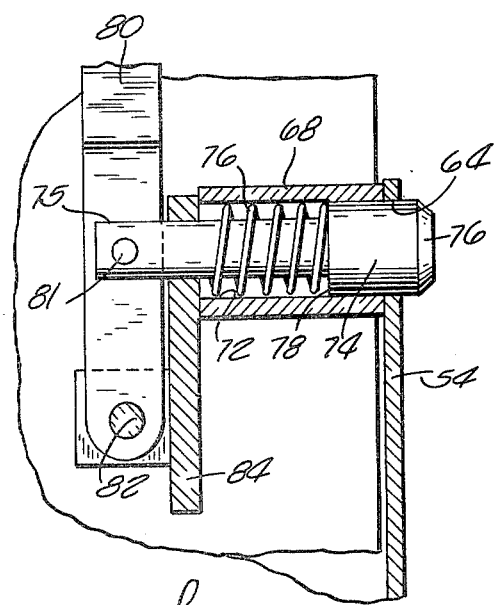
FIG. 6 is an enlarged fragmentary view of the locking mechanism shown in a locked position.

Mounted on the stand body 36 above the pivot block 46 is a second member or stop block 68 having an arcuate inner surface conforming to the exterior of the stand body 36. The stop block 68 (FIG. 6) includes a bore 72 slidably receiving a locking pin 74 for reciprocative movement relative to the bracket leg 54 along an axis generally parallel to the stand pivot axis. The locking pin 74 has a slotted outer end 75 and an inner end 76 which is received in the bracket aperture 64 when the stand 34 is in the support position and is received in the bracket aperture 66 when the stand 34 is in the stowed position. The inner end 76 of the locking pin 74 is biased into releasable engagement with the apertures 64 and 66 by a spring 77 disposed in the stop block bore 72 with one end bearing against an annular shoulder 78 provided on the locking pin 74.

The locking pin 74 is retracted from the bracket apertures 64 and 66 against the biasing force of the spring 77 by an arm or lever 80 which is pivotally connected, at an intermediate location 81, to the outer end 75 of the locking pin 74. The lower end of the lever 80 is pivotally mounted at 82 on a strap 84 which is mounted on and depends from the stop block 68. The upper or outer portion of the lever 80 extends above the tongue 24 when the stand 34 is in the support position and is arranged to serve as a handle for pivoting the stand 34 from one position to another after the locking pin 74 has been retracted from a respective aperture 64 and 66.

To move the stand 34 from the support position to the stowed position after the trailer has been hitched to a towing vehicle, the base member 38 has to be cranked up with the crank 44 only far enough for the foot 40 to clear the ground surface, rather than being cranked up several inches for over-the-road travel as is the case with many prior art constructions. Moreover, the base member 38 has to be cranked down only a small distance to lower the foot 40 into engagement with the ground surface when the stand 34 is returned to a support position prior to unhitching. Thus, considerable time and effort is saved during the hitching and unhitching operations.

If a towing vehicle is accidentally slammed against the tongue 24 during hitching with the stand 34 in the support position, the resultant pivotal force applied on the stand 34 (in the clockwise direction as viewed in FIG. 1) could damage the locking pin 74 to the point where the locking mechanism is no longer operable. That is, the locking pin 74 could be sheared off or bent so it could not be retracted from a bracket aperture. This potential problem is minimized by providing the stop block 68 with an outer surface 88 which extends generally parallel to the stand pivot axis and engages the inner surface 90 of the bracket cross leg 58 as shown in FIGS. 3 and 5 to prevent pivotal movement of the stand 34 in the clockwise direction as viewed in FIG. 1.

While a preferred embodiment of the invention has been described and illustrated, it should be understood that the various alterations and modifications can be made thereto without departing from the spirit and scope of the invention.

I claim:

1. A detachable trailer comprising
   a mobile load-carrying frame,
   a tongue extending forwardly from said frame and adapted to be hitched to a towing vehicle;

a support assembly for selectively supporting said tongue from the ground at an elevation desired for hitching to the towing vehicle, said support assembly including an elongated main support and a ground-engagable base portion adjustably mounted on said main support for relative axial movement;

means mounting said main support on said tongue for pivotal movement of said support assembly relative to said tongue about a generally horizontal axis between a support position wherein said main support extends in a generally vertical direction and said base portion is engagable with the ground surface and a stowed position wherein the clearance between said support assembly and the ground surface is sufficient for over-the-road travel; and locking means on said main support and on said tongue for selectively and releasably retaining said support assembly in the support and stowed positions, said locking means including a pin mounted for reciprocative movement relative to said main support, means on said tongue defining a pair of apertures for receiving said pin, one of said apertures being situated at a location corresponding to the support position of said support assembly and the other being situated at a location corresponding to the stowed position of said support assembly, means biasing said pin into releasable engagement with said apertures, and a lever pivotally supported on said support assembly and connected to said pin for retracting said pin from said apertures against the biasing force of said biasing means and for pivoting said support assembly between the support and stowed positions after said pin has been retracted from said apertures.

2. A trailer according to claim 1 wherein said support assembly is mounted for pivotal movement in a rearwardly direction when moved from the support position to the stowed position, said tongue includes a vertical surface extending generally parallel to the pivot axis of said support assembly, and said support assembly includes a stop for engaging said surface and cooperating therewith to prevent pivotal movement of said support assembly in the forwardly direction when said support assembly is in the support position.

3. A trailer according to claim 2 wherein said pin is carried for reciprocative movement in a block member mounted on said main support and having an edge adapted to serve as said stop.

4. A trailer according to claim 1 wherein said main support mounting means includes a separate shaft member mounted on said main support, and said trailer includes a bracket mounted on said tongue, said bracket pivotally supporting the opposite ends of said shaft member and including said apertures.

5. A trailer according to claim 4 wherein said bracket has a generally J-shaped cross section with a first leg including said apertures, a second leg shorter than and laterally spaced from said first leg and a cross leg connecting said first and second legs and having a generally vertically extending inner surface;

said main support is pivotally supported between said first and second bracket legs for pivotal movement in the rearwardly direction when said support assembly is moved from the support position to the stowed position; and said support assembly includes a stop for engaging the inner surface of said bracket cross leg and cooperating therewith to prevent pivotal movement of said support assembly in the forwardly direction when said support assembly is in the support position.

6. A trailer according to claim 1 wherein said support assembly comprises a screw type jack including said main support and said base.

* * * * *